July 19, 1960      A. R. GAMA ET AL      2,945,769

CEMENT COMPOSITION

Filed Aug. 8, 1957      2 Sheets-Sheet 1

INVENTORS
ARMANDO R. GAMA
WENDELL G. MARKHAM
BY
ATTORNEY

FIG. 3.
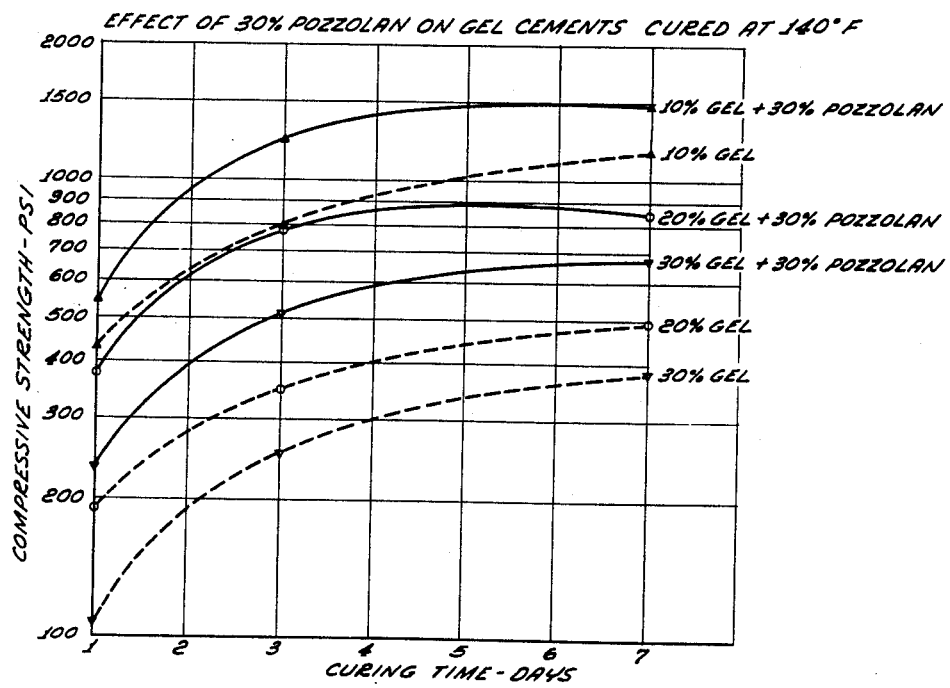
EFFECT OF 30% POZZOLAN ON GEL CEMENTS CURED AT 140°F
COMPRESSIVE STRENGTHS, NEW COMPOSITION OF TABLE E AT VARIOUS TEMPERATURES
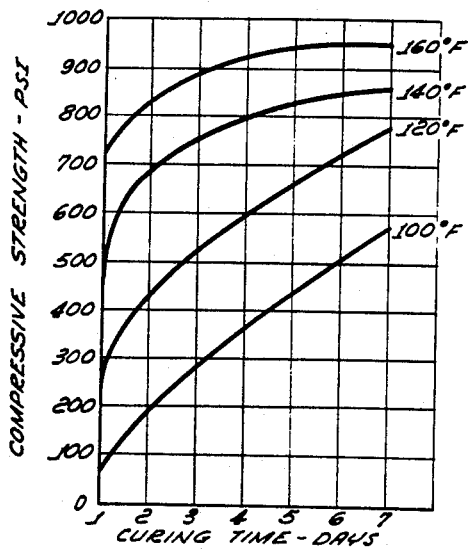
FIG. 4.
INVENTORS
ARMANDO R. GAMA
WENDELL G. MARKHAM
BY
*Allen LeHambly*
ATTORNEY United States Patent Office 2,945,769
Patented July 19, 1960

2,945,769
CEMENT COMPOSITION

Armando R. Gama, Whittier, and Wendell G. Markham, Downey, Calif., assignors to BJ Service, Inc., Long Beach, Calif., a corporation of Delaware Filed Aug. 8, 1957, Ser. No. 677,096

12 Claims. (Cl. 106—98)

The present invention relates to oil well cementing and more particularly to a markedly improved cementing composition and method of cementing oil wells.

Numerous cementing compositions have been produced heretofore for use in performing various cementing operations which are resorted to before oil and gas wells are finally completed and allowed to produce. One type of cementing operation commonly conducted consists of cementing in place the casing which is run into the borehole. In this operation, a fluid, settable cementing composition or slurry is introduced into the casing and pumped down into the well around the lower extremity of the casing into the space between the casing and the borehole. The slurry may be caused to circulate back up to the surface of some operations. As a result, when the slurry sets or hardens, the casing is firmly affixed in the borehole.

Neat construction cement has been used for this purpose, as well as mixes of Portland cement, pozzolana, clays, or various other fillers or extenders, activators, retarders and/or dispersing agents for effecting variations in the viscosity, setting time, strength, density, permeability, or other characteristics, of the cement composition.

The development of special slurry mixes presents problems involving various characteristics of the cementing compositions.

For example, the initial viscosity and slurry density are important in connection with pumping time and horsepower requirements. Usually, a well which is being cemented is full of drilling mud which must be displaced ahead of the cement slurry. Rapid pumping of the slurry creates maximum turbulence, with resultant superior mud displacement ahead of the slurry. Low viscosity, low density slurry may be more rapidly pumped, and likewise minimizes the tendancy of the cement slurry to channel through the mud, this being one of the major factors where cementing operation failure occurs.

Another important consideration in the production of an oil well cementing composition is the thickening rate of the slurry to, say, 100 poises. In cementing oil wells, the slurry is pumped through oftentimes thousands of feet of casing and is subjected to relatively high temperatures as compared with surface or atmospheric temperatures. Therefore, any admix which may have a beneficial effect upon slurry density or initial viscosity should not speed up thickening of the mix, since fairly prolonged periods of time are required to pump the slurry into place, and if the slurry thickens too rapidly, efficient cementing cannot be accomplished.

Other important factors which must be taken into consideration from the standpoint of producing a practical, efficient and inexpensive cement slurry include: the slurry yield per sack of cement; the water or fluid loss; the density per cubic foot of slurry; the setting time, both initial and final set, of the slurry; the strength of the set product; its permeability; the resistance of the set product to chemical breakdown; thickening time; and, of course, as a practical consideration, the cost of the slurry.

Over the years, the development of an economical cement composition having a high yield has been sought. Bentonitic clay, or sodium bentonite, has been employed as a logical additive because of its high water requirements in a cement slurry mix, with consequent high yield. However, the use of bentonite, a colloidal clay, in sufficient volume to produce an economically desirable slurry results in a finished product of low compressive strength.

Pozzolanic materials have also been used as an admix in cement compositions; these pozzolanas include naturally occurring ones such as opaline shale, volcanic glasses and glassy rock, crystalline silicas, siliceous clays, as well as artificial pozzolana such as fly ash. Among these pozzolanic admixes is the calcined natural pozzolana of the opaline shale type. These latter pozzolanas are a desirable additive in cementing slurries in that they have a high water requirement and, therefore, substantially increase slurry yield. The resultant yield is of a lower density, but like bentonite, these pozzolanas are non-cementitious in themselves. Other opaline shale-type pozzolanas may also be advantageously employed, such as diatomite, Monterey shale, diatomaceous shale and others, as well as other types of pozzolanic materials of the general types above referred to.

In order to avail of the favorable characteristics of low density, low cost, and high gel strength of bentonite as a slurry admix, while obviating the loss of strength of the set product caused by large quantities of bentonite, pozzolanas have been employed as a supplemental admix in what might be termed a low gel slurry containing bentonite in proportions of on the order of 8% to 12% by weight of cement, in order to further increase the yield of slurry per sack of cement. However, tests of the resultant hardened mixes showed an adverse reaction, as shown in the following table, wherein the cement used was API Class C cement:

TABLE A

| Mix No. | Cmt., Lbs. | Pozzolana, Lbs. | Gel (Ben.), Lbs. | Water, Gals. | Slurry Density, Lbs./Gal. | Curing Temp., °F. | Curing Time, Days | Compress. Strength, p.s.i. |
|---|---|---|---|---|---|---|---|---|
| 1 | 94 | 0 | 7.52 | 12.7 | 12.5 | 100 | 1 | 420 |
|   | 94 | 0 | 7.52 | 12.7 | 12.5 | 100 | 7 | 723 |
| 2 | 94 | 47 | 7.52 | 19.1 | 12.1 | 100 | 1 | 217 |
|   | 94 | 47 | 7.52 | 19.1 | 12.1 | 100 | 7 | 787 |
| 1 | 94 | 0 | 7.52 | 12.7 | 12.5 | 140 | 1 | 575 |
|   | 94 | 0 | 7.52 | 12.7 | 12.5 | 140 | 7 | 788 |
| 2 | 94 | 47 | 7.52 | 19.1 | 12.1 | 140 | 1 | 622 |
|   | 94 | 47 | 7.52 | 19.1 | 12.1 | 140 | 7 | 1,229 |
| 3 | 94 | 0 | 11.28 | 15.1 | 12.0 | 100 | 1 | 352 |
|   | 94 | 0 | 11.28 | 15.1 | 12.0 | 100 | 7 | 509 |
| 4 | 94 | 47 | 11.28 | 21.5 | 11.9 | 100 | 1 | 170 |
|   | 94 | 47 | 11.28 | 21.5 | 11.9 | 100 | 7 | 675 |
| 3 | 94 | 0 | 11.28 | 15.1 | 12.0 | 140 | 1 | 352 |
|   | 94 | 0 | 11.28 | 15.1 | 12.0 | 140 | 7 | 536 |
| 4 | 94 | 47 | 11.28 | 21.5 | 11.9 | 140 | 1 | 527 |
|   | 94 | 47 | 11.28 | 21.5 | 11.9 | 140 | 7 | 1,032 |

As shown in the above table, Mix No. 1 had greater compressive strength than Mix No. 2 when cured for 1 day at 100°. When the temperature was elevated to 140° and the mixes were cured for seven days, Mix No. 2 showed 1229 p.s.i. compressive strength, as compared with only 788 p.s.i. for Mix No. 1. Presumably this benefit in compressive strength was attributable to the addition of the pozzolana. However, in order to satisfy economic and practical considerations, it was desirable to provide a slurry having even lower density and greater yield than Mixes No. 1 and No. 2. Accordingly, Mixes No. 3 and No. 4 were prepared and tested to determine the benefits of pozzolana in a higher gel mix. As the above table shows, the results in respect to compressive strength were adverse, and the compressive strength of Mix No. 4, when cured for seven days at 140° was only 1032 p.s.i. as compared with 1229 p.s.i. compressive strength of Mix No. 2. From the standpoint of yield per sack of cement however, Mix No. 4 yielded approximately 3.289 cubic feet as compared with only 2.942 cubic feet yield of Mix No. 2.

The results of the foregoing test mixes, as well as other test mixes, conclusively indicated to those skilled in the art that the advantages to be derived from the use of pozzolanas in high gel mixes were limited, and for years these limitations have governed in the preparation of oil well cementing compositions.

However, in accordance with this invention, we have discovered that an extremely good mix can be derived from properly proportioning the quantities of pozzolana and gel or bentonite in ranges higher than have been heretofore resorted to because of the belief that adverse results would be attained.

The resultant mix of the invention has a markedly reduced cost as compared with neat or other commonly employed cement mixes. This is accomplished primarily by the provision of a so-called high gel cement, with resultant high yields per sack of cement, such high gel cement having an admix of pozzolana in such proportions as to render the high yield cement strong as compared with other high gel cements which characteristically have a low compressive strength.

Moreover, other practical considerations are satisfied by our new cement, as will hereinafter more fully appear.

The invention involves the discovery that the proper combination of pozzolanic material and lime produces a mix having unprecedented strength provided by the formation of calcium silicates and aluminates resulting from the interaction of hydrated lime and the silica and alumina of the pozzolana and the bentonite. One simple equation representing this reaction is:

$$CaO \cdot H_2O + SiO_2 \xrightarrow{H_2O} CaO \cdot SiO_2 \cdot H_2O$$

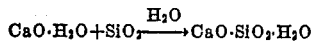

Similar reactions result in the formation of the di and tribasic silicates ($2CaO \cdot SiO_2 + 3CaO \cdot SiO_2$).

Earlier tests as represented in Table A show the normal and expected results of the effects of high concentrations of gel or bentonite on the physical properties of cement compositions. In following up the findings of the results of mixing lime and pozzolana, the effect of the latter in high gel slurries containing percentages of bentonite ranging upwards from 10% to 40% and more by weight of cement, was further tested and observed. The results were surprising, unexpected, and unprecedented, in that instead of lessened compressive strengths, the incorporation of pozzolana in certain proportions resulted in significantly higher values. This phenomenon was investigated with varying concentrations of pozzolana and gel or bentonite and the test mixes were cured for one, three and seven days at 140° F.

In the accompanying graphs:

Fig. 3 shows the effect of 30% pozzolana on high gel compositions similar to those of the graph of Fig. 1; and Fig. 4 shows the compressive strength of a cement composition in accordance with the invention at various temperatures.

Figure 1:
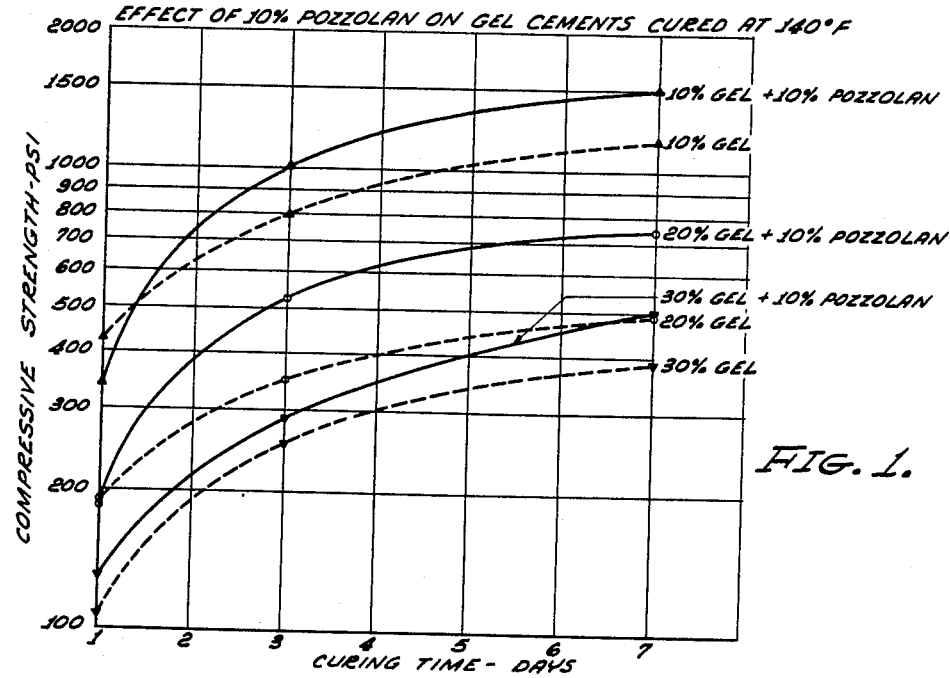
Fig. 1 shows the effect of 10% pozzolana on cement compositions containing respectively 10%, 20%, and 30% gel or bentonite by weight cement.
Figure 2:
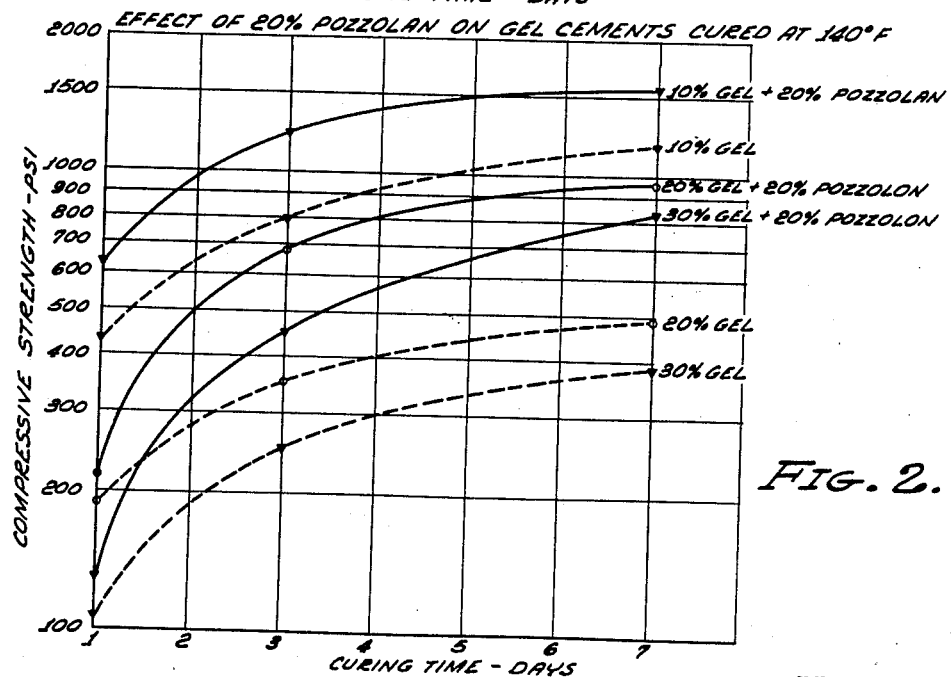
Fig. 2 shows the effect of 20% pozzolana on compositions similar to those of the graph of Fig. 1.

As is readily apparent from these graphs, the addition of the pozzolana to high gel or bentonite cement compositions markedly increases the compressive strength of the cement, so that the high gel cement with its attendant practical and economic advantages may be employed in oil well cementing procedures. In some instances (see Fig. 3), the strengths of cements containing 20% and 30% gel are doubled at one and three days and almost doubled at seven days. This result can be directly ascribed to the addition of the pozzolana, the efficacy of which is even more notable when it is considered that the pozzolana is, in itself, a non-cementitious material.

Preferably, fine ground calcined pozzolanas of the natural opaline shale type are employed. Such fine ground pozzolana is beneficial in numerous respects. Paramount among these is the fact that this extremely fine pozzolana in a cement composition results in a fine mix, since there is a distribution of fine particles of various sizes. Such an aggregate allows the solid materials to fit much closer together than if all particles were the same size. This contributes to greater strength and lower permeability. In addition, a more rapid pozzolanic reaction is possible with very finely ground particles.

In its broadest aspects, the invention hereof contemplates a cement composition containing relatively high proportions of gel or bentonite and pozzolana, whereby a relatively high volume per sack of cement is yielded and the set cement has adequate compressive strength for use in performing practically all sub-surface oil well cementing operations. More specifically, however, the invention contemplates the addition of strength activators for further increasing the compressive strength of the mix when cured for one day.

In order to enhance the formation of calcium silicates and aluminates, additives of soluble silicate salts, calcium chloride and hydrated lime were included in experimental high gel pozzolana slurries. The following Table B shows the results where the slurries were prepared using 94 pounds Colton cement, API Class B, 30% pozzolana, and 20% gel, respectively, by weight of cement:

As a practical matter, the use of anhydrous sodium metasilicate fines may insure smoother blending of the dry materials than is readily obtained when granular anhydrous sodium metasilicate is employed.

Primarily because of the more rapid solubility of anhydrous sodium metasilicate fines, as compared with the granular material, fines were used in test slurries to determine the optimum concentration for highest yield and compressive strength. These tests were conducted with slurries containing, by weight of cement, 20% and 30% gel with 30% pozzolana. The results of such tests are tabulated below:

TABLE B

*Effect of soluble calcium and silicate salts on compressive strength of high gel-pozzolana slurries cured at 140° F. containing 30% pozzolana and 20% gel by weight cement*

| Test No. | Activator By Weight Cement | Percent Water By Weight Solids | Initial Viscosity, Poise | Cure, Days | Compressive Strength, p.s.i. |
|---|---|---|---|---|---|
| 721 | 0 | 125.4 | @ 14 | 1 | 339 |
| 504 | 0 | 125.4 | @ 14 | 3 | 776 |
| 539 | 0 | 125.4 | @ 14 | 7 | 848 |
| 506 | 5% Calcium Chloride | 127.7 | 8-10 | 3 | 668 |
| 505 | 5% Anhydrous Sodium Metasilicate | 127.7 | @ 45 | 3 | 806 |
| 507 | 5% Anhydrous Sodium Metasilicate+5% Calcium Chloride | 128.2 | 10-12 | 3 | 764 |
| 508 | 5% Anhydrous Sodium Metasilicate+10% Lime (Ca(OH)₂) | 128.2 | @ 40 | 3 | 785 |
| 509 | 10% Anhydrous Sodium Metasilicate | 128.2 | @ 30 | 3 | 878 |
| 527 | do | 128.2 | @ 30 | 7 | 1,053 |
| 516 | 10% Anhydrous Sodium Metasilicate+1% Calcium Lignosulfonate | 128.1 | @ 30 | 3 | 1,195 |
| 526 | do | 128.1 | @ 30 | 7 | 1,230 |

The foregoing tests show the favorable effect of sodium metasilicate on the compressive strength of high gel pozzolana slurries. However, they also show a concomitant rise in initial viscosity.

Accordingly, in order to retain the added strength while reducing initial viscosity, several soluble silicates of different alkali:silica ratios were used. These tests were made with sodium metasilicate with an alkali:silica ratio of 1:1 (in both granular and fine forms), with an alkali:silica ratio of 1:3.2, with an alkali:silica ratio of 1:2, and the latter in a spray-dried form containing 17.5% water. In addition, small quantities of calcium lignosulfonate were utilized to disperse the bentonite during mixing and to reduce slurry viscosity.

As a result of these tests, it was found that a slurry containing 94 pounds of cement, plus 30% pozzolana and 20% gel by weight of the cement, and 10% anhydrous sodium metasilicate by weight of the cement, mixed with 149% water by weight of the solids, had an initial viscosity poise on the order of 17 to 20, and a compressive strength of 625 p.s.i. when cured at 140° for one day, 924 p.s.i. in 3 days, and 1002 p.s.i. in 7 days. It was concluded from the latter tests that granular anhydrous sodium metasilicate with an alkali:silica ratio of 1:1, used preferably with 149% water by weight of the solids was most desirable because of the greater slurry yield and the lower initial viscosity. It is to be understood that the invention also contemplates, however, the use of other activators of the group referred to above with other quantities of water and/or gel-pozzolana proportions.

TABLE C

*The effect of sodium silicate on 20% and 30% gel cement containing 30% pozzolana per 94 pounds cement cured at 140° F.*

| Percent Pozzolana By Weight Cement | Percent Gel By Weight Cement | Percent Sodium Silicate By Weight Cement | Compressive Strength, p.s.i. (Approximate) | | |
|---|---|---|---|---|---|
| | | | 1 Day | 3 Days | 7 Days |
| 30 | 20 | 0 | 180 | 350 | 490 |
| 30 | 20 | 2.5 | 255 | 530 | 690 |
| 30 | 20 | 5.0 | 287 | 615 | 875 |
| 30 | 20 | 7.5 | 342 | 561 | 720 |
| 30 | 20 | 10.0 | 425 | 535 | 662 |
| 30 | 20 | 12.5 | 380 | 395 | 450 |
| 30 | 30 | 0 | 107 | 254 | 387 |
| 30 | 30 | 2.5 | 157 | 388 | 525 |
| 30 | 30 | 5.0 | 174 | 470 | 612 |
| 30 | 30 | 7.5 | 237 | 554 | 725 |
| 30 | 30 | 10.0 | 291 | 550 | 720 |
| 30 | 30 | 12.5 | 335 | 450 | 525 |
| 30 | 30 | 15.0 | 323 | 357 | 387 |

The above table clearly indicates that in mixes of 20% gel and 30% pozzolana by weight of cement, the introduction of sodium silicate becomes ineffective as a strength activator in a range between 10% and 12% by weight of the cement, after the cement has cured for 7 days. Even though the 12% sodium silicate mix cured with a greater compressive strength in one day and three days than the mix containing no sodium silicate, in seven days the latter had more compressive strength than the former. A similar situation is reflected in the 30% gel+30% pozzolana mix when the mix has as much as 15% strength activator or sodium silicate. Sodium silicate, in concentrations of 15% or more by weight of cement, results in decreasing compressive strengths as well as being impractical from the economic standpoint.

Accordingly, it will be observed that as an average amount, 7.5% sodium silicate may be advantageously utilized in both tabulated mixes to provide the most desirable compressive strength characteristics during the entire curing process from one to seven days. This concentration is also in accord with other economic and practical considerations. It should be understood, however, that the invention is not necessarily limited to the use of any such specific concentration of sodium silicate.

The pozzolana utilized in the preceding tests was, in each instance, of the calcined natural opaline shale type, which test pozzolana specifically is a calcined oil impregnated diatomaceous opaline shale, but the invention is not necessarily limited to use with such pozzolanas alone. For instance, comparative tests were made with a calcined natural pozzolana composed of calcareous diatomaceous earth. In the case of each test slurry containing the latter pozzolana, the compressive strength was increased as compared with non-pozzolana mixes and other practical considerations were satisfied to varying extents, depending upon the concentration of the pozzolanic material and the gel, as well as depending upon the presence or absence of a strength activator. In the tests, regular construction (API Class A) cement was used, and 7.5% anhydrous sodium metasilicate in granular form was employed in some slurries, but no activator was used in others, together with appropriate amounts of water. Pozzolana A is of the calcined opaline shale type; namely, calcined oil impregnated diatomaceous opaline shale, and pozzolana T is composed of calcined calcareous diatomaceous earth and is of the volcanic glass and glassy rock class.

TABLE D

*Comparison of effect of different pozzolanas in slurries cured at 140° F.*

| Pozzolana, Percent By Weight Cement | Gel, Percent By Weight Cement | Activator, Percent By Weight Cement | Compressive Strength, p.s.i. | |
|---|---|---|---|---|
| | | | 1 Day | 3 Days |
| 0 | 20 | 0 | 180 | 350 |
| A-30 | 20 | 0 | 320 | 710 |
| A-30 | 20 | 7.5 | 510 | 685 |
| T-30 | 20 | 0 | 345 | 620 |
| T-30 | 20 | 7.5 | 340 | 475 |

It will be observed from the above table that while the incorporation of different pozzolanic materials in the slurries, together with activating materials and without such latter material, the compressive strength of the cured cement varies. But in each instance, it will be observed that the resultant compressive strength is markedly improved, as compared with the test high gel slurry containing no pozzolana. Of course, the attendant economic and practical benefits of high gel compositions are derived from the mixes along with increased compressive strength.

Following upon the extremely desirable, yet unexpected results described above, it has been discovered that for many cementing operations, slurries containing even higher proportions of pozzalanas are extremely effective and practical due to their high yield, low density, slow thickening, high chemical resistance, low fluid loss, and other characteristics.

Specifically, the invention contemplates a cement composition containing approximately equal parts by weight of cement and pozzolana, plus a high percentage of gel or bentonite, on the order of about 30% by weight cement or more, with an appropriate volume of water.

One particularly good and practical mix is a 1:2:32 mix, containing 1 sack cement, 2 sacks pozzolana (47 pounds per sack, and 32% gel or bentonite by weight of the cement. Such a mix contains the dry ingredients in approximately the following proportions by weight:

| | Pounds |
|---|---|
| Cement | 94 |
| Pozzolana | 94 |
| Bentonite | 30 |

Preferably, the mix also includes a strength activator consisting of 7.5% anhydrous sodium metasilicate in accordance with the tests shown in Table C; and, if desired, the mix may contain a small percentage, say, 0.5% up to 2.5% of a dispersing agent such as calcium lignosulfonate.

One specific mix composition in accordance with the invention is set out in the table below in comparison with a popular 8% gel slurry which is well known in the art. In this new mix, the pozzolana was of the calcined opaline shale type, specifically calcined oil impregnated opaline shale.

TABLE E

*Comparison of popular economical 1:0:8 mix with mix of this invention*

MIX

| Solids Weight, Lbs. | 1:0:8 | New |
|---|---|---|
| Cement | 94 API Class C (Lonestar Incor). | 94 API Class A (Lonestar Construction). |
| Pozzolana | 0 | 94. |
| Gel | 7.52 | 30.1. |
| Sodium Silicate (Na$_2$SiO$_3$) | 0 | 7.05. |
| Volume Solids, Cu. Ft | 0.530 | 1.346. |
| Water: | | |
| Weight, Lbs | 105.8 | 397.3. |
| Volume, Cu. Ft | 1.695 | 6.376. |

The physical properties of these two mixes are compared in the following table:

TABLE F

*Physical properties of slurries of Table E*

| Mix | 1:0:8 | New |
|---|---|---|
| Slurry Yield, Cubic Feet | 2.23 | 7.72 |
| Slurry Weight, Lbs./Cu. Foot | 93.2 | 80.6 |
| Viscosity Poise: | | |
| Initial | 8 | 18 |
| 30 Min | 20 | 42 |
| Thickening Time—Hrs.: Mins. to 100 Poises—Pan American High Pressure Cement Consistometer: | | |
| API Schedule #5 (8,000' @ 125° F.) | 2:14 | 7:30 |
| API Schedule #6 (10,000' @ 144° F.) | 1:33 | 2:50 |
| API Schedule #7 (12,000' @ 172° F.) | | 1:28 |
| Compressive Strength p. s. i.: | | |
| Cured 1 Day @ 140° F | 554 | 454 |
| Cured 3 Days @ 140° F | 769 | 703 |

As shown in the above table, the new mix hereof has a relatively high yield, low weight and slow thickening time to 100 poises, yet it develops more than sufficient compressive strength in twenty-four hours or longer. This is true, moreover even under various temperature conditions, wherein the compressive strength of the above referred to new mix of Table E varies depending upon temperature conditions, as is clearly indicated in the graph of Fig. 4.

The effect of increased curing temperatures on the new mix of Table E clearly reflects that the improved slurry is eminently suited for use in all but surface cementing operations, in that the compressive strength of the new mix is more than adequate.

Summarizing the invention, we have discovered that an extremely advantageous well cementing composition can be prepared by properly proportioning quantities of pozzolana and bentonite in ranges higher than have heretofore been thought practicable in the face of existing knowledge of the effects of pozzolanas and bentonite in cement slurries.

As exemplified in Table G1 below, increased quantities of bentonite in a cement composition, while increasing the slurry yield, were known to cause a substantial reduction in compressive strength. As exemplified in Table G2 below, increased quantities of pozzolana in a cement composition have also resulted in marked reductions in cement strength, while effecting substantial increases in slurry yield.

From this knowledge, the industry has concluded that substantial adverse effects would result in combining pozzolana and bentonite in a slurry, such conclusions being substantiated by the test mixes shown in Table A above.

However, in accordance with the present invention, and as evidenced in Table G3 below, tests have conclusively shown that unexpected and significant increases in strength are obtained by a cement composition containing certain proportions of pozzolana and bentonite, the novel cement composition, moreover, yielding a high volume.

vided an improved cement composition, and while we have described or shown specific exemplary mixes, the invention is not limited thereto. Instead, the invention contemplates a mix which is characterized as a high gel cement containing on the order of from 10% upwards to 40% bentonite or gel by weight of cement, together with a pozzolanic material in relative proportions of from 10% upwards to 100% by weight of cement, either with or without activator and/or dispersing agents more or less in the proportions hereinabove mentioned. The resultant slurry satisfies all practical and economic considerations, and constitutes a substantial advance in the art of oil well cementing.

As employed in the following claims, the term "cement" contemplates hydraulic cements such as Portland cement, and the term "gel" contemplates colloidal clay such as bentonite.

We claim:

1. An improved cement slurry for cementing casings in the borehole of a well consisting essentially of Portland cement, a pozzolanic material in the relative proportion

TABLE G1

*Strength comparison of neat Portland cement with cement containing bentonite*

[160° F. curing temperature]

| Mix No. | Lbs. Dry Solids | | Water For Mix, Gals. | Slurry Yield, Cu. Ft./Sack | Compressive Strength (p. s. i.) at Curing Time | | | | |
|---|---|---|---|---|---|---|---|---|---|
| | API Class A Cement | Bentonite | | | 8 Hrs. | 12 Hrs. | 1 Day | 3 Days | 7 Days |
| 1 | 94 | 0 | 5.2 | 1.17 | 2,900 | 3,600 | 4,650 | 6,000 | 6,380 |
| 2 | 94 | 11.28 | 12.4 | 2.21 | 350 | 520 | 840 | 1,035 | 1,030 |
| 3 | 94 | 18.80 | 17.2 | 2.90 | 180 | 240 | 375 | 490 | 495 |

TABLE G2

*Strength comparison of neat Portland cement with cement containing pozzolana*

[160° F. curing temperature]

| Mix No. | Lbs. Dry Solids | | Water For Mix, Gals. | Slurry Yield, Cu. Ft./Sack | Compressive Strength (p. s. i.) at Curing Time | | | | |
|---|---|---|---|---|---|---|---|---|---|
| | API Class A Cement | Pozzolana | | | 8 Hrs. | 12 Hrs. | 1 Day | 3 Days | 7 Days |
| 1 | 94 | 0 | 5.2 | 1.17 | 2,900 | 3,600 | 4,650 | 6,000 | 6,380 |
| 4 | 94 | 47 | 11.6 | 2.34 | 570 | 1,200 | 2,760 | 3,200 | 3,350 |
| 5 | 94 | 94 | 18.1 | 3.51 | 290 | 780 | 1,490 | 2,000 | 2,260 |

TABLE G3

*Strength cement containing pozzolana plus bentonite admixes*

[160° F. curing temperature]

| Mix No. | Lbs. Dry Solids | | | Water For Mix, Gals. | Slurry Yield, Cu. Ft./Sack | Compressive Strength (p. s. i.) at Curing Time | | | | |
|---|---|---|---|---|---|---|---|---|---|---|
| | API Class A Cmt. | Bentonite | Pozzolana | | | 8 Hrs. | 12 Hrs. | 1 Day | 3 Days | 7 Days |
| 6 | 94 | 11.28 | 47 | 18.8 | 3.38 | 340 | 595 | 1,055 | 1,440 | 1,425 |
| 7 | 94 | 11.28 | 94 | 25.3 | 4.55 | 375 | 605 | 865 | 1,030 | 1,185 |
| 8 | 94 | 18.80 | 94 | 30.1 | 5.24 | 270 | 495 | 700 | 840 | 1,010 |

In addition, our new mix is far less expensive than either neat cement or the popular 1:0:8 shown in the above Tables E and F, and shows remarkably lower fluid losses than neat cement and other mixes containing bentonite.

As will be apparent from the foregoing, we have proof from 10 through 100% by weight of said cement, a gelatinous clay in the relative proportion of from 10 through 40% by weight of said cement and water to provide a pumpable slurry.

2. An improved cement slurry for cementing casings in the borehole of a well, consisting essentially of Portland cement, a pozzolanic material in the relative proportion of 100% by weight of said cement, a gelatinous clay in the relative proportions of 32% by weight of said cement and water to provide a slurry mixture having a volume between 3.8 and 7.72 cu. ft. per 94 lb. unit sack of said cement.

3. An improved cement slurry for cementing casings in the borehole of a well, consisting essentially of Portland cement, a pozzolanic material in the relative proportion of 100% by weight of said cement, a gelatinous clay in the relative proportions of 32% by weight of said cement and water sufficient to provide a slurry mixture having a volume of 7.72 cu. ft. per 94 lb. unit sack of said cement.

4. An improved cement slurry for cementing casings in the borehole of a well, consisting essentially of Portland cement, a pozzolanic material of the group consisting of opaline shale, volcanic glasses, glassy rock, crystalline silica, siliceous clays and calcined naturally occurring calcareous diatomaceous earth in the relative proportion of 100% by weight of said cement, bentonite in the relative proportion of 32% by weight of said cement, an activator of the group consisting of calcium chloride and calcium metasilicate in the relative proportion of 7.5% by weight of said cement and water to provide a pumpable slurry.

5. An improved cement slurry for cementing casings in the borehole of a well, consisting essentially of Portland cement, a pozzolanic material of the group consisting of opaline shale, volcanic glasses, glassy rock, crystalline silica, siliceous clays and calcined naturally occurring calcareous diatomaceous earth in the relative proportion of 100% by weight of said cement, bentonite in the relative proportion of 32% by weight of said cement, an activator of the group consisting of calcium chloride and calcium metasilicate in the relative proportion of 7.5% by weight of said cement, a dispersing agent consisting of calcium lignosulfonate in the relative proportion of 1% by weight of said cement and water to provide a pumpable slurry.

6. The method of cementing casings in the borehole of a well consisting of pumping into said well a cement slurry consisting essentialy of Portland cement, a pozzolanic material in the relative proportion of from 10 through 100% by weight of said cement, a gelatinous clay in the relative proportion of from 10 through 40% by weight of said cement and water to provide a pumpable slurry.

7. The method of cementing casings in the borehole of a well consisting of pumping into said well a cement slurry consisting essentially of Portland cement, a pozzolanic material in the relative proportion of 100% by weight of said cement, a gelatinous clay in the relative proportion of 32% by weight of said cement and water sufficient to provide a slurry mixture having a volume of 7.72 cu. ft. per 94 lb. unit sack of said cement.

8. An improved cement slurry as defined in claim 1, including a soluble salt activator of the group consisting of calcium chloride and anhydrous sodium metasilicate in the relative proportion of 2.5 through 10% by weight of said cement.

9. An improved cement slurry as defined in claim 1, including calcium lignosulfonate in the relative proportion of 0.5 through 2.5% by weight of said cement as a dispersing agent.

10. An improved cement slurry as defined in claim 1, wherein said pozzolanic material is one of the group consisting of opaline shale, volcanic glasses, glassy rock, crystalline silica, siliceous clays and calcined naturally occurring calcareous diatomaceous earth.

11. An improved cement slurry as defined in claim 3, wherein said pozzolanic material is one of the group consisting of opaline shale, volcanic glasses, glassy rock, crystalline silica, siliceous clays and calcined naturally occurring calcareous diatomaceous earth.

12. An improved cement slurry as defined in claim 4, including water in sufficient volume to provide a slurry mixture having a volume of 7.72 cu. ft. per 94 lb. unit of said cement.

References Cited in the file of this patent
UNITED STATES PATENTS

| | | |
|---|---|---|
| 1,710,921 | Cross et al. | Apr. 30, 1929 |
| 2,364,555 | Scripture | Dec. 5, 1944 |
| 2,698,256 | Shea et al. | Dec. 28, 1954 |